United States Patent [19]
Van Der Scheer et al.

[11] Patent Number: 4,976,856
[45] Date of Patent: Dec. 11, 1990

[54] PROCESS FOR PREPARING NON-POROUS, SELECTIVE MEMBRANE LAYERS

[75] Inventors: Albert Van Der Scheer, Sittingbourne, United Kingdom; Jan Werner, Amsterdam, Netherlands

[73] Assignee: Shell Oil Company, Houston, Tex.

[21] Appl. No.: 322,449

[22] Filed: Mar. 13, 1989

[30] Foreign Application Priority Data

Mar. 21, 1988 [GB] United Kingdom ................. 8806674

[51] Int. Cl.$^5$ ............................................. B01D 69/12
[52] U.S. Cl. ................................ 210/490; 210/500.36; 264/22
[58] Field of Search ........................... 264/22; 427/40; 210/500.27, 500.37, 490, 500.33, 500.23, 500.36; 55/16, 156

[56] References Cited

U.S. PATENT DOCUMENTS

| | | | |
|---|---|---|---|
| 4,032,440 | 6/1977 | Yasuda | 210/500.33 X |
| 4,230,463 | 10/1980 | Henis et al. | 55/16 |
| 4,347,139 | 8/1982 | Hayashi | 210/500.37 X |
| 4,533,369 | 8/1985 | Okita | 55/158 |
| 4,692,347 | 9/1987 | Yasuda | 427/40 |
| 4,784,764 | 11/1988 | Giordano, Jr. et al. | 210/500.27 X |
| 4,806,246 | 2/1989 | Nomura | 210/500.23 X |

*Primary Examiner*—Frank Spear

[57] ABSTRACT

The invention relates to a process for preparing non-porous, selective membrane layers by contacting a permeable, continuous substrate (e.g. comprising a non-porous, permeable intermediate layer and a microporous support layer) with the glowing zone of a plasma.

15 Claims, No Drawings

PROCESS FOR PREPARING NON-POROUS, SELECTIVE MEMBRANE LAYERS

BACKGROUND OF THE INVENTION

The invention relates to a process for preparing non-porous, selective membrane layers. Various processes for preparing membrane layers are known, such as phase-inversion solvent spreading, dipping, spraying and plasma treating. The former processes have been found useful to prepare membrane layers which can be highly permeable for certain fluids, however, in many cases at the expense of the selectivity (i.e. the ratio of permeabilities of at least two fluids in a mixture). The latter process i.e. plasma treating of a substrate with an inert gas, which may be combined with a polymerizable hydrocarbonaceous compound, is known to be suitable for the preparation of non-porous (i.e. dense) selective top layers of composite multi-layer membranes. However, the selectivities attained with membranes thus prepared are in some cases not sufficiently high for commercial application in e.g. gas separation processes.

SUMMARY OF THE INVENTION

Surprisingly, it has now been found that by contacting a substrate with the glowing zone of a plasma, very selective membrane layers can be prepared which layers are, moreover, non-porous. The invention therefore relates to a process for preparing non-porous selective membrane layers which comprises contacting a permeable continuous substrate with the glowing zone of a plasma.

DETAILED DESCRIPTION OF THE INVENTION

Plasma's are suitably generated in an enclosed space in which a pressure substantially below 0.1 bar is maintained e.g. by means of a vacuum pump, by transferring energy (e.g. thermal or electromagnetic) to a gas contained in the enclosed space and thereby producing reactive plasma particles such as electrons, ions, radicals, molecular fragments and atoms in the ground state or in an excited state. A number of different plasma generation means can be employed in the present process such as direct current arc-, ion beam-, radio frequency (r.f.)- and microwave-plasma generation means. The ion beam generation method is regarded less suitable for the present purpose than r.f., microwave and microwave-electron cyclotron resonance plasma generation due to the limited efficiency of the production of reactive plasma particles using said method. Plasma is preferably generated in an electrodeless plasma generation zone (in order to avoid contamination of the hydrocarbonaceous membrane-forming compound(s) with electrode material) by means of capacitive or inductive coupling, most preferably by capacitative coupling which appears to result in higher selectivities of the membranes thus obtained than when inductive coupling is applied.

In the process according to the invention the plasma is preferably generated by means of high frequency electromagnetic waves, in particular at frequencies from 0.1 MHz ($10^5$ Hz) to 35 GHz ($3.5 \times 10^{10}$ Hz). Microwave plasmas (frequency range from 0.1-35 GHz, in particular from 1-10 GHz) are similar, but not identical, to r.f. plasmas (frequency range from 0.1-100 MHz, in particular from 1-10 MHz). The use of microwave plasmas result in some cases in significantly higher deposition rates of plasma polymer on a substrate than the use of r.f. plasmas.

The process according to the present invention is preferably carried out in the presence of a non-polymerizable plasma-forming fluid e.g. an inorganic gas such as nitrogen, hydrogen, oxygen, ammonia and/or carbon dioxide, and in particular an inert gas; more preferably, said fluid contains at least one element from Group 0 of the Periodic Table of the Elements, in particular argon; mixtures of argon with hydrogen and/or helium can be also suitably used as plasma-forming fluid. Reference is made to the Periodic Table of the Elements as given in the Handbook of Chemistry and Physics, 55th edition (1975), CRC Press, Ohio, U.S.A.

The plasma is visible in the vicinity of the electromagnetic energy source as a glow; the glow is a qualitative indication for the electron density of the plasma which is relatively high close to the energy source and decreases at increased distance from the plasma generation zone. The area in which a visible glow is present is the glowing zone. In the case of argon-containing plasmas, photoemission from excited argon atoms results in a blue glow.

Hydrocarbonaceous monomers can be introduced into the plasma generation zone in order to allow the reactant particles to form, under plasma polymerization conditions, an ultra thin hydrocarbonaceous membrane layer on a substrate in the glowing zone. Dissociation of the hydrocarbonaceous molecules, i.e. the amount of inter-atomic bonds that break, can be influenced by (1) varying the ratio of the fluid flow rates of the plasma-forming fluid and the hydrocarbonaceous compound(s) introduced into the glowing zone (preferably, said ratio is from 0.1 to 100 for the present process, and in particular from 0.5 to 10 in order to prepare non-porous, highly selective membrane layers having a cross-linked structure); (2) varying the power supplied to the plasma; (3) varying the reactor pressure; and (4) varying the residence time of particles in the reactor.

In order to be able to provide controlled plasma surface treating without depositing undesired components on the surface of the substrate on which the non-porous membrane layer is to be formed, the process according to the invention is preferably carried out by maintaining the pressure in the glowing zone from 0.01-100 Pa for both the microwave-and r.f. plasmas, and preferably from 0.1-100 Pa. The electron density in microwave plasma is usually about one order of magnitude higher than in r.f. -plasma whereas the electron energies are generally of the same order in both types of plasma (1-10 eV). The higher electron density observed in the former plasma is probably a result of the somewhat more pronounced high energy tail in the electron energy distribution curve for microwave plasmas.

The contacting time of the substrate with the plasma in the glowing zone is preferably from 10 seconds to 20 minutes, and in particular from 0.5 min. to 15 min. In some cases the permeability of membrane layers prepared in accordance with the present process appears to increase with shorter contacting times which can be advantageous provided that the selectivity of the resulting membranes does not decrease to an unacceptable low level.

The choice of a hydrocarbonaceous compound which is to be employed in the plasma glowing zone is an important factor for attaining the desired properties of the membrane layers prepared in said zone. The hydrocarbonaceous compound(s) suitably comprises a monomeric organic compound of an ionizable nature such as aromatics, organosilanes, olefins, alkylene oxides, (halogenated) lower hydrocarbons and (acrylo) nitriles. Said hydrocarbonaceous compounds preferably comprise at least one aromatic monomer, in particular toluene.

The invention furthermore relates to membranes comprising a membrane layer prepared according to a process as described hereinbefore. Membrane-layers can be distinguished as to their microstructural form in porous and non-porous (or dense) membrane layers. The latter type of membrane layer has a much higher ability to allow selective transport of molecular species which makes membranes containing such layers suitable for molecular separation processes, such as gas separation and separation of liquid hydrocarbons from solvents. With such dense membranes, molecules can be separated when their solubility and/or diffusivity in the membrane layer differs significantly.

However, a problem associated with the use of dense membrane layers is their vulnerability due to their usually very small thickness of e.g. 10-1000 nm (nanometer) which is required to attain acceptable permeability rates for commercial applications. The strengthening of such ultrathin, dense, selective membrane layers by supporting them by means of a porous substrate which shows a very high permeability in combination with a low selectivity for gaseous and/or liquid compounds, compared with the dense top layer, is already known. Furthermore, it is known to interpose a non-porous, highly permeable intermediate layer between a porous substrate and a dense, selective top layer.

Surprisingly, it has now been found that plasma-treated non-porous membranes having very high selectivities can be prepared by allowing reactants in the glowing zone to contact a microporous support layer which has been coated first with a non-porous, permeable intermediate layer on the side which is to be plasma-treated. The non-porous, highly permeable intermediate layer serves two purposes, viz. support of the (polymer) layer formed by plasma-treating and distribution of permeated fluid over the porous substrate. The stability of the intermediate layer enables the application of a very thin top layer formed by a selective film formed under influence of the plasma in combination with a substrate having pores of a size sufficiently large to keep the flow resistance imposed by said pores upon use of the membrane relatively small. The second function of the intermediate layer, i.e. distribution of the fluid passed through the dense selective polymer film, allows the whole area of the latter film to be effectively used for fluid separation, despite of the presence of the porous substrate. The intermediate layer therefore allows, at a given composition of the membrane film, higher permeation rates than obtainable with membranes with porous substrates.

For optimal permeability, the thickness of the intermediate layer is preferably from 0.01 to 5 $\mu$m. The intermediate layer may suitably consist of a homopolymer, a copolymer or a miscible mixture of polymers. Typical examples of homopolymer suitable for forming gas separation membranes are organosiloxanes such as a polydimethylsiloxane. Copolymers of siloxanes and polycarbonates may also be applied. Silicon present in the intermediate layer appears to play a role in the formation of the selective layer formed by plasma treatment, resulting in the presence of silicon in the selective layer and excellent bonding of the two layers. Moreover, the silicon-content of the selective layer appears to influence gas transport therethrough.

The selective top layer of plasma polymerizate preferably has a thickness of less than 0.1 $\mu$m in order to keep the permeability through said layer at an acceptable level. It is assumed that since various modes of reactions take place simultaneously during plasma treatment in the glowing zone the polymer film thereby obtained will have a structure different from that of a polymer film formed by conventional plasma polymerization. Differences in structure may be deduced from differences in gas separation selectivities between plasma polymer films obtained by different methods.

The porous substrate may be formed from any suitable material and may have any suitable shape. A porous polymer e.g. polyalkylene film can be suitably used for serving as a porous substrate for the selective top layer and the intermediate layer. Porous polyimide, and in particular porous polypropylene, are preferred substrates.

It is also possible to use various porous inorganic materials as substrate for the process and membranes according to the invention. Suitably, the materials applied are of a ceramic nature, either crystalline or substantially amorphous, in particular alumina, silica, porous glass or quartz. These substrates may be flat or tubular. Tubular, and in particular capillary, membranes can withstand relatively high pressure differences between their inner and outer walls for a given wall thickness and are therefore sometimes preferred over flat membranes.

The pores in the porous substrate should be relatively small for allowing support of thin films but should on the other hand be sufficiently large as to restrict flow resistance upon the passage of permeate. The pores should preferably have a diameter in the range of 1 nanometre (nm) to 1 micrometre ($\mu$m). The surface porosity of the porous substrate should be chosen such that the permeate throughput through said substrate is at least ten times larger than the permeate throughput of the selective top layer formed by plasma polymerization.

Membranes according to the invention are suitably provided with a further dense layer on top of the selective top layer, for protecting the latter against mechanical damage. This dense protecting layer should have a high permeability but does not need to be selective. The thickness of the protective layer should preferably be chosen smaller than about 5 $\mu$m in order to keep the permeability relatively high compared with the permeability of the selective layer. The protecting layer may consist of a homopolymer, a copolymer or a mixture of polymers. In a suitable embodiment the protecting layer has a composition identical to that of the intermediate layer.

The following Example illustrates the invention.

EXAMPLE

Three-layered membranes comprising a porous polypropylene support layer, an intermediate organosilane polymer layer and a non-porous, selective top layer were prepared by depositing a layer of plasma polymerized toluene in the glowing zone in the presence of argon on a substrate comprising the support- and intermediate layers. All experiments were performed at a reaction pressure of 5 Pa and a temperature of 20° C. in a tubular reactor equipped with an external radio frequency coil operated at a frequency of 5.0 MHz and 50 Volt. The argon and toluene were both supplied through a tube into the reactor. The additional reaction conditions at which the Experiments were carried out and the resulting thickness of the plasma polymerized membrane layer are given in Table 1.

TABLE 1

| Experiment No. | 1 | 2 | 3 | 4 |
|---|---|---|---|---|
| Ar flow ml (STP).s$^{-1}$) | 0.0033 | 0.0062 | 0.0062 | 0.0062 |
| flow ratio Ar: toluene | 0.8 | 4.6 | 4.8 | 4.6 |
| reaction time (min) | 10 | 10 | 10 | 5 |
| thickness (nm) | 81 | 47 | 23 | 10 |

Experiment No. 1 has been included for comparative purposes only and has not been carried out in accordance with the present process since the glowing zone was restricted to the plasma tube only and did not extend into the reactor. Hence, the substrate was not contacted with the glowing zone in Experiment No. 1. Experiments Nos. 2–4 were carried out in accordance with the present process. Experiments 3 and 4 were carried out with the coupling between plasma and power being capacitive, whereas Experiments 1 and 2 were carried out with said coupling being inductive.

The three-layer membranes obtained in Experiments 1–4 were tested at a temperature of 20° C. with a mixture containing approximately equal volumes of carbon dioxide and methane. Test conditions and results are given in the following Table 2.

TABLE 2

| Experiment No. | 1 | 2 | 3 | 4 |
|---|---|---|---|---|
| Pressure of feed (50/50 $CO_2/CH_4$) mixture in bar | 21.2 | 19.0 | 19.8 | 19.8 |
| Selectivity ($CO_2/CH_4$) | 14.2 | 33.0 | 56.2 | 40.5 |

The pressure at the permeate side (the uncoated microporous polypropylene support layer) was 1.0 bar for all experiments. The selectivity of the membranes was obtained as the ratio of the permeability of carbon dioxide and that of methane.

From the results given in Tables 1 and 2 it will be clear that ultrathin, non-porous and very selective membrane layers can be obtained, employing the process according to the invention (Experiments 2–4). Furthermore, it is observed that the use of capacitive coupling to induce plasma formation results in a further improvement of the selectivity (Experiments 3 and 4), as compared with the use of inductive coupling (Experiment 2).

We claim:

1. A process for preparing non-porous selective membrane layers which comprises contacting a permeable continuous substrate with the glowing zone of a plasma generated using a hydrocarbonaceous compound under plasma polymerization conditions wherein a hydrocarbonaceous layer is formed on said substrate.

2. The process according to claim 1 wherein the plasma is generated by high frequency electromagnetic waves.

3. The process according to claim 2 wherein a frequency from 0.1 MHz to 35 GHz is employed to generate the plasma.

4. The process according to claim 2 wherein the plasma is generated in an electrode-less plasma generation zone by means of capacitive or inductive coupling.

5. The process according to claim 1 wherein the total pressure in the glowing zone is from 0.01–1000 Pa.

6. The process according claim 1 which is carried out in the presence of a non-polymerizable plasma-forming fluid.

7. The process of claim 6 wherein the fluid is an inert gas.

8. The process according to claim 6 wherein the ratio of the fluid flow rates of the non-polymerizable fluid and the hydrocarbonaceous compound in the glowing zone is from 0.1 to 100.

9. The process of claim 8 wherein the ratio is from 0.5 to 10.

10. The process according to claim 1 wherein an aromatic compound is employed as a hydrocarbonaceous compound.

11. The process of claim 10 wherein the hydrocarbonaceous compound is toluene.

12. The process according to claim 1 wherein the contacting time of the substrate with the plasma in the glowing zone is from 10 seconds to 20 minutes.

13. The process of claim 12 wherein the contacting time is from 0.5 minutes to 15 minutes.

14. The process according to claim 1 wherein the substrate comprises a microporous support layer and a non-porous, permeable intermediate layer.

15. A membrane comprising a membrane layer prepared according to the process of claim 1.

* * * * *